United States Patent [19]

Yamaguchi et al.

[11] Patent Number: 4,840,842
[45] Date of Patent: Jun. 20, 1989

[54] ABRASIVE TAPE

[75] Inventors: Nobutaka Yamaguchi; Masaaki Fujiyama; Masami Suzuki; Yasuyuki Yamada, all of Kanagawa, Japan

[73] Assignee: Fuji Photo Film Co., Ltd., Kanagawa, Japan

[21] Appl. No.: 100,857

[22] Filed: Sep. 25, 1987

[30] Foreign Application Priority Data

Sep. 25, 1986 [JP] Japan .................. 61-226459

[51] Int. Cl.$^4$ .............................................. G11B 5/702
[52] U.S. Cl. ..................... 428/323; 428/328; 428/329; 428/330; 428/331; 428/336; 428/425.9; 428/522; 428/900
[58] Field of Search .............. 428/900, 323, 327, 328, 428/329, 330, 331, 654, 336, 425.9, 522

[56] References Cited

U.S. PATENT DOCUMENTS

| | | |
|---|---|---|
| 4,397,911 | 8/1983 | Akashi et al. ...................... 428/900 |
| 4,529,661 | 7/1985 | Ninomiya et al. .................. 428/694 |
| 4,600,521 | 7/1986 | Nakamura et al. ................. 428/900 |
| 4,613,545 | 9/1986 | Chubachi et al. ................... 428/900 |
| 4,656,089 | 4/1987 | Ninomiya et al. .................. 428/900 |
| 4,707,410 | 11/1987 | Hata et al. .......................... 428/900 |
| 4,752,524 | 6/1988 | Yamaguchi et al. ................ 428/323 |
| 4,756,960 | 7/1988 | Yamaguchi et al. ................ 428/323 |
| 4,764,423 | 8/1988 | Yamaguchi et al. ................ 428/323 |

Primary Examiner—George F. Lesmes
Assistant Examiner—James B. Monroe
Attorney, Agent, or Firm—Sughrue, Mion, Zinn, Macpeak and Seas

[57] ABSTRACT

An abrasive tape comprises a flexible substrate, and an abrasive layer overlaid on the flexible substrate by applying an abrasive coating composition containing abrasive grains and a binder onto the flexible substrate and drying the applied abrasive coating composition. The binder contains a vinyl chloride resin having a —SO$_3$M group, where M represents Li, Na or K, and an epoxy group.

21 Claims, 1 Drawing Sheet

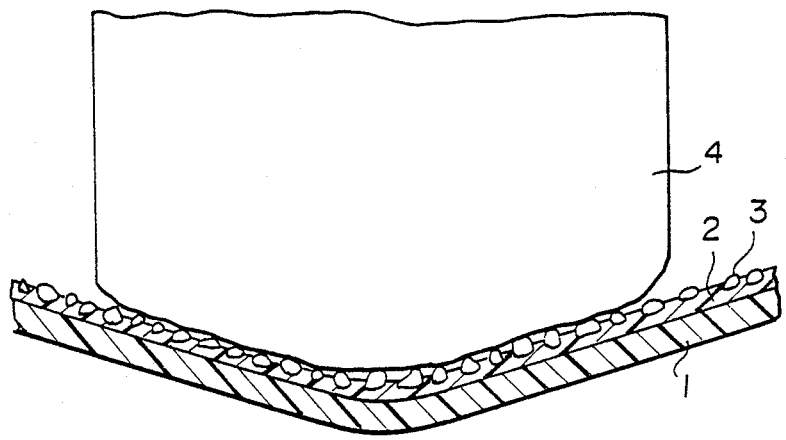

ABRASIVE TAPE

BACKGROUND OF THE INVENTION

1. Field of the Invention

This invention relates to an abrasive tape for use in polishing of a magnetic head for a magnetic recording and reproducing apparatus. This invention particularly relates to an abrasive tape for use in polishing of a magnetic head mainly by being moved between two reels.

2. Description of the Prior Art

Video or high grade audio magnetic heads are required to have very smooth tape sliding surfaces. Therefore, in general, in the process of making the magnetic head, the magnetic head is disposed at a predetermined position after rough grinding, and the tape sliding surface of the magnetic head is finished to be smooth by moving an abrasive tape between two reels disposed with the magnetic head intervening therebetween. In general, the abrasive tape comprises a flexible substrate, and a coating film formed on the flexible substrate by applying an abrasive composition containing fine abrasive grains, a binder, and optionally an additive such as a lubricant, which are kneaded together, onto the flexible substrate. Since the substrate of the abrasive tape is flexible, the abrasive tape can accurately polish the tape sliding surface of the magnetic head by snugly fitting to the curved shape thereof.

As the abrasive tape, there has heretofore been known, for example, a cleaning tape as disclosed in Japanese Unexamined Patent Publication No. 53(1978)-102017, which comprises a substrate, and a coating film overlaid on the substrate by applying thereonto an abrasive composition containing, for example, abrasive grains consisting of zinc oxide (ZnO), a binder consisting mainly of a vinyl chloride resin, and various additives such as a curing agent consisting of a polyisocyanate or the like and a lubricant such as silicone oil, which are kneaded together.

Accordingly, it is considered to replace only the abrasive grains by a substance harder than zinc oxide in the aforesaid cleaning tape and to use the tape thus obtained as an abrasive tape.

However, with the abrasive tape formed by using the vinyl chloride resin as the binder, dispersibility of the abrasive grains by the vinyl chloride resin is low, and the abrasive grains often agglomerate and concentrate at a portion of the abrasive tape, thereby causing scratching of the polished surface.

On the other hand, in recent years, magnetic heads formed of Permalloy are used widely. However, Permalloy is a soft and readily corrodible alloy, and therefore the tape sliding surface of the Permalloy magnetic head is readily corroded. With the abrasive tape formed by using the vinyl chloride resin as the binder, hydrochloric acid is readily released from the binder and corrodes the polished surface contacting the abrasive tape. Therefore, the abrasive tape formed by using the vinyl chloride resin as the binder is not suitable particularly in the case where the material which is to be polished is readily corrodible as in the case of the Permalloy magnetic head.

SUMMARY OF THE INVENTION

The primary object of the present invention is to provide an abrasive tape formed by using a vinyl chloride resin as a binder, which exhibits good dispersibility of abrasive grains and which does not corrode the polished surface even though the polished material is readily corrodible as in the case of the Permalloy magnetic head.

Another object of the present invention is to provide an abrasive tape suitable particularly for finish polishing.

The present invention provides an abrasive tape comprising a flexible substrate, and an abrasive layer overlaid on said flexible substrate by applying an abrasive coating composition containing abrasive grains and a binder onto said flexible substrate and drying the applied abrasive coating composition, wherein said binder contains a vinyl chloride resin having a $-SO_3M$ group, where M represents Li, Na or K, and an epoxy group.

The vinyl chloride resin is a copolymer, and may contain a monomer for introducing other polar groups such as $-OH$, $-COOM'$, $-OSO_3M'$,

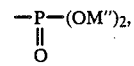

and $-NH_2$, where M' represents hydrogen or an alkali metal, and M" represents hydrogen, an alkali metal, or a hydrocarbon group.

Of course, the binder used in the abrasive tape in accordance with the present invention may be composed of the vinyl chloride resin alone, or may be composed of the vinyl chloride resin and other constituents.

With the abrasive tape in accordance with the present invention, the vinyl chloride resin having a $-SO_3M$ group and an epoxy group is used as the binder in the course of the formation of the abrasive layer.

The $-SO_3M$ group in the vinyl chloride resin imparts good dispersion properties to the vinyl chloride resin and has the effect of uniform dispersion of the abrasive grains in the abrasive layer without agglomeration and concentration of the abrasive grains at a portion of the abrasive layer, thereby preventing scratching of the polished surface.

Also, the epoxy group in the vinyl chloride resin has the effect of prevention of dehydrochlorination of vinyl chloride and elimination of the problem with regard to corrosion of the polished surface of the polished material such as the Permalloy magnetic head caused by dehydrochlorination.

Therefore, with the abrasive tape in accordance with the present invention wherein the vinyl chloride resin having a $-SO_3M$ group and an epoxy group is used as the binder, both the effect of the $-SO_3M$ group on prevention of scratching of the magnetic head by improvement of dispersibility of the abrasive grains and the effect of the epoxy group on prevention of corrosion of the magnetic head by prevention of dehydrochlorination can be obtained. Also, the effects on prevention of scratching and corrosion are improved markedly by a synergistic effect of the presence of the $-SO_3M$ group and the presence of the epoxy group as compared with the case where the $-SO_3M$ group alone or the epoxy group alone is present in the vinyl chloride resin.

BRIEF DESCRIPTION OF THE DRAWING

The single drawing is an enlarged sectional view showing an embodiment of the abrasive tape in accordance with the present invention, which is in the use condition for polishing a magnetic head.

DESCRIPTION OF THE PREFERRED EMBODIMENTS

The present invention will hereinbelow be described in further detail with reference to the accompanying drawing.

As shown in the drawing, an embodiment of the abrasive tape in accordance with the present invention comprises a flexible substrate 1, and an abrasive layer 2 overlaid on the substrate 1. The abrasive layer 2 is formed by kneading abrasive grains 3, a binder, and various additives which may be used when necessary, thereby to prepare an abrasive coating composition, applying the abrasive coating composition thus prepared onto the substrate 1, and drying the applied abrasive coating composition.

When the abrasive tape is used for polishing the tape sliding surface of a magnetic head 4 as an example of the material which is to be polished, the abrasive tape is moved at a predetermined speed from one to two reels (not shown) disposed with the magnetic head 4 intervening therebetween to the other thereof. Thus the abrasive layer 2 is made to slide on the magnetic head 4. At this time, the tape sliding surface of the magnetic head 4 is polished smoothly by hard abrasive grains 3 protruding out of the surface of the abrasive layer 2.

The binder contained in the abrasive layer 2 contains a vinyl chloride resin having a —$SO_3M$ group, where M represents Li, Na or K, and an epoxy group.

The vinyl chloride resin is a copolymer of vinyl chloride with a monomer, which is copolymerizable with vinyl chloride, for example, a vinyl ester derivative such as vinyl acetate, vinylidene chloride, acrylonitrile, styrene, or an acrylic ester, and the —$SO_3M$ group and the epoxy group are bonded to the copolymer. The number-average molecular weight of the vinyl chloride resin should preferably be within the range of 15,000 to 60,000. Also, the content of vinyl chloride in the vinyl chloride resin should preferably be at least 60 wt %, and the content of the other constituent copolymerizable with vinyl chloride should preferably be lower than 40 wt %. The content of vinyl chloride in the vinyl chloride resin should more preferably be within the range of 80 to 90 wt %, and the content of the other constituent copolymerizable with vinyl chloride should preferably be within the range of 20 to 10 wt %. The ratio of the —$SO_3M$ group to the vinyl chloride resin should preferably be within the range of 0.1 to 4.0 wt % in terms of $SO_4$, more preferably within the range of 0.2 to 1.5 wt % in terms of $SO_4$, and most preferably within the range of 0.5 to 1.0 wt % in terms of $SO_4$.

The ratio of the epoxy group to the vinyl chloride resin should preferably be within the range of 0.1 to 10 wt %, more preferably within the range of 0.8 to 8 wt %, and most preferably within the range of 1.5 to 7 wt %.

As defined above, M in the —$SO_3M$ group is selected from Li, Na and K. Particularly, the —$SO_3M$ group should preferably be the —$SO_3Na$ group since the —$SO_3Na$ group imparts the highest dispersibility of the abrasive grains to the vinyl chloride resin.

Also, polymers different from the aforesaid vinyl chloride resin may be added to the binder in such a ratio that the effects of the binder are not adversely affected, i.e. in a ratio within the range of 1 to 1.5 wt % with respect to the amount of the vinyl chloride resin having a —$SO_3M$ group and an epoxy group. Such polymers may be, for example, rubber type polymers such as an acrylonitrile-butadiene copolymer and a styrene-butadiene copolymer, cellulose derivatives such as cellulose nitrate and cellulose acetate, and polyurethane.

In the present invention, the vinyl chloride resin having a —$SO_3M$ group and an epoxy group should preferably be contained in the binder in a ratio of at least 30 wt % with respect to the total amount of the binder components. When the ratio of the vinyl chloride resin having a —$SO_3M$ group and an epoxy group is lower than 30 wt %, substantial effects cannot be expected.

Also, the amount of the vinyl chloride resin having a —$SO_3M$ group and an epoxy group should preferably be within the range of 15 to 50 parts per 100 parts of the abrasive grains, and should more preferably be within the range of 20 to 40 parts per 100 parts of the abrasive grains.

In the present invention, a polyisocyanate having curing effects should preferably be added as an additive to the abrasive coating composition together with the aforesaid binder. In the case where a polyisocyanate, for example, a low molecular polyisocyanate having a plurality of isocyanate groups and having a molecular weight within the range of 150 to 2,000, is added to the abrasive coating composition, a three-dimensional network structure can be formed in the abrasive layer, thereby to improve the physical strength of the abrasive layer. As a result, durability of the abrasive layer can be improved, and scratching of the polished surface can be minimized. The ratio of the low molecular polyisocyanate added should preferably be within the range of 1 to 60 wt % with respect to the total amount of the binder components, and should more preferably be within the range of 10 to 40 wt % with respect to the total amount of the binder components from the viewpoint of the reinforcing effects and the pot life of the abrasive coating composition. Also, the ratio of the low molecular polyisocyanate added should preferably be at least 20 parts per 100 parts of the vinyl chloride resin used as the binder, and should more preferably be within the range of 30 to 60 parts per 100 parts of the vinyl chloride resin used as the binder. The term "low molecular polyisocyanate" as used herein embraces an isocyanate monomer having a plurality of isocyanate groups, a polymer of such an isocyanate monomer, and an adduct of the isocyanate monomer or the isocyanate polymer with a compound such as a polyhydric alcohol. The isocyanate monomer may be, for example, ethane diisocyanate, 2,2,4-trimethylpentane diisocyanate, $\omega,\omega'$-diisocyanate-1,3-dimethylbenzole, $\omega,\omega'$-diisocyanate-1,2-dimethylcyclohexane diisocyanate, naphthalene-1,4-diisocyanate, or triphenylmethane-4,4',4''-triisocyanate.

Also, in the present invention, a lubricant may be added as an additive to the abrasive coating composition together with the aforesaid binder for improving movement stability of the abrasive tape as in the case of the conventional cleaning tape.

The abrasive grains should preferably have a Mohs hardness of at least 6 and should preferably be harder than those used in the conventional cleaning tape. The abrasive grains should more preferably have a Mohs hardness of at least 8.

As the abrasive grains having a high Mohs hardness, chromic oxide ($Cr_2O_3$, Mohs hardness: 8.5), aluminum oxide ($\alpha$-$Al_2O_3$, Mohs hardness: 9), silicon carbide ($\alpha$-SiC, Mohs hardness: 9.5) or the like may be used, among which chromic oxide exhibits moderate hardness, good abrasive effects, and little risk of scratching of the polished surface, and thus is suitable for finish polishing.

The grain sizes of the abrasive grains should preferably be within the range of approximately 16 μm to 0.1 μm. Particularly, for regular finishing wherein high polishing accuracy is required, the grain sizes should preferably be within the range of approximately 1 μm to 0.1 μm.

The thickness of the abrasive layer 2 formed of the abrasive coating composition essentially consisting of the aforesaid abrasive grains, the binder and the additives should preferably be not larger than 50 μm, depending on the shape and material of the magnetic head in the case where the material which is to be polished is the magnetic head. When the thickness of the abrasive layer 2 is too thick, the contacting condition of the abrasive tape with the magnetic head is deteriorated.

The flexible substrate 1 may be formed of polyethylene terephthalate (PET), polyethylene-2,6-naphthalate or the like.

The present invention will further be illustrated by the following non-limitative examples.

EXAMPLE 1

An abrasive tape was made by applying an abrasive coating composition as shown below to a thickness of 5 μm onto a 12 μm-thick polyethylene terephthalate (PET) substrate and drying the applied abrasive coating composition. The parts in the following descriptions are parts by weight (weight of solid contents).

Abrasive coating composition:
$Cr_2O_3$: 300 parts
(granular, size: 0.3μ, Mohs hardness: 8.5)
Vinyl chloride resin: 55.7 parts
(Vinyl chloride: 87 wt %, number-average molecular weight: $2.6 \times 10^4$, epoxy group content: 3.5 wt %, sodium sulfonate group content: 0.5 wt %, where wt % is a value with respect to the weight of the vinyl chloride resin)
Soybean lecithin: 2.4 parts
Silicone oil (dimethyl polysiloxane): 0.1 part
Polyisocyanate: 18 parts
(75 wt % ethyl acetate solution of a reaction product of 3 mols of 2,4-tolylene diisocyanate compound with 1 mol of trimethylolpropane)
Methyl ethyl ketone: 400 parts
Toluene: 400 parts

EXAMPLE 2

An abrasive tape was made in the same manner as Example 1, except that an abrasive coating composition obtained by omitting the polyisocyanate in the abrasive coating composition for the abrasive tape in Example 1 and changing the amount of the vinyl chloride resin to 73.7 parts was used.

COMPARATIVE EXAMPLE 1

As a comparative example, an abrasive tape was made by applying the abrasive coating composition as shown below onto a substrate approximately similar to that used in Example 1 and drying the applied abrasive coating composition. The sample obtained by Comparative Example 1 is the same as Sample No. 24 disclosed in Japanese Unexamined Patent Publication No. 53(1978)-102017.

Abrasive coating composition:
ZnO: 300 parts
(size: 120 μm diameter, Mohs hardness: 4.5)
Vinyl chloride-vinyl acetate copolymer: 34.7 parts
(copolymerization ratio: 87:13, polymerization degree: 350)
Polyester polyol: 21 parts
(reaction product of 1 mol of adipic acid, 1 mol of diethylene glycol, with 0.06 mol of trimethylolpropane; viscosity at 75° C.: 1,000CP, specific gravity: 1.18, OH value: 60, acid value: <2)
Soybean lecithin: 2.4 parts
Silicone oil (dimethyl polysiloxane): 0.1 part
Polyisocyanate: 18 parts
(75 wt % ethyl acetate solution of a reaction product of 3 mols of 2,4-tolylene diisocyanate compound with 1 mol of trimethylolpropane)
Methyl ethyl ketone: 400 parts
Toluene: 400 parts

COMPARATIVE EXAMPLE 2

An abrasive tape was made in the same manner as Example 1, except that an abrasive coating composition obtained by changing the weight ratios of the epoxy group and the sodium sulfonate group of the vinyl chloride resin with respect to the vinyl chloride resin in the abrasive coating composition for the abrasive tape in Example 1 as shown below was used.
Epoxy group content: 0 wt %.
Sodium sulfonate group content: 0.5 wt %.

COMPARATIVE EXAMPLE 3

An abrasive tape was made in the same manner as Example 1, except that an abrasive coating composition obtained by changing the weight ratios of the epoxy group and the sodium sulfonate group of the vinyl chloride resin with respect to the vinyl chloride resin in the abrasive coating composition for the abrasive tape in Example 1 as shown below was used.
Epoxy group content: 3.5 wt %.
Sodium sulfonate group content: 0 wt %.

COMPARATIVE EXAMPLE 4

An abrasive tape was made in the same manner as Example 1, except that an abrasive coating composition obtained by changing the weight ratios of the epoxy group and the sodium sulfonate group of the vinyl chloride resin with respect to the vinyl chloride resin in the abrasive coating composition for the abrasive tape in Example 1 as shown below was used.
Epoxy group content: 0 wt %.
Sodium sulfonate group content: 0 wt %.

For the abrasive tapes of Examples 1 and 2, and Comparative Examples 1, 2, 3 and 4, conditions of scratches on the head surfaces after polishing of the ferrite video heads were investigated. Also, corrosion characteristics of the abrasive tapes were investigated by contacting the abrasive tapes with Permalloy audio heads and observing the conditions of corrosion on the head surfaces. The results were as shown in Table 1.

TABLE 1

| | Scratches on head surface (scratches/0.5 mm) | Corrosion of head |
| --- | --- | --- |
| Example 1 | 0 | None |
| Example 2 | 3 | None |
| Comp. Example 1 | 50< | Heavy corrosion |
| Comp. Example 2 | 8 | Medium corrosion |
| Comp. Example 3 | 20 | Slight corrosion |
| Comp. Example 4 | 29 | Heavy corrosion |

In Table 1, scratches on the head surfaces were investigated by observing the surfaces of the ferrite video heads, which had been polished for one minute with the respective abrasive tapes, by use of a microscope and counting scratches having a width of at least 2 μm. Corrosion of the heads was investigated by contacting each abrasive tape with each Permalloy audio head for three days at 60° C. and 80% RH, and then observing the surface of the head.

As is clear from Table 1, with the abrasive tapes of Examples 1 and 2 in accordance with the present invention, scratches on the head surface are decreased markedly and corrosion on the head surface is prevented substantially as compared with the abrasive tapes of Comparative Examples 1 to 4.

The $-SO_3M$ group has the effect of improvement of the dispersibility of the abrasive grains and uniform dispersion of the abrasive grains in the abrasive layer, thereby to prevent scratching on the polished surface. The epoxy group has the effect of prevention of dehydrochlorination, and consequently prevents corrosion of the polished surface caused by dehydrochlorination, particularly corrosion of the polished surface of readily corrodible material such as Permalloy.

In Examples 1 and 2 in accordance with the present invention, both the $-SO_3M$ group and the epoxy group are contained in the vinyl chloride resin. As may be understood by comparison with Comparative Examples 2 and 3 in which only one of the $-SO_3M$ group and the epoxy group is contained in the vinyl chloride resin, the abrasive tapes of Examples 1 and 2 in accordance with the present invention have markedly larger effects on prevention of scratching and corrosion of the magnetic head than when only one of the $-SO_3M$ group and the epoxy group is contained in the vinyl chloride resin. Specifically, the $-SO_3M$ group and the epoxy group cooperate to enhance the effect of prevention of scratching and the effect of prevention of corrosion. Thus the excellent effect of the abrasive tapes of Examples 1 and 2 in accordance with the present invention on the prevention of scratching and corrosion are obtained by synergistic effects of the $-SO_3M$ group and the epoxy group.

The synergistic effects of the $-SO_3M$ group and the epoxy group are obtained presumably because the vinyl chloride resin is present uniformly on the surfaces of the abrasive grains by virtue of the presence of the $-SO_3M$ group in the vinyl chloride resin, and abrasive grain sections and vinyl chloride resin sections are not present locally in the abrasive layer, so that the effect of the epoxy resin on prevention of corrosion of magnetic heads by prevention of dehydrochlorination is improved. Also, though the surface of the magnetic head is readily scratched in the case where dehydrochlorination occurs, it is considered that the effect of the $-SO_3M$ group on prevention of scratching of the magnetic head caused by the abrasive grains is improved by the effect of the epoxy group on prevention of dehydrochlorination.

It should be understood that the present invention may be modified in various manners and is not limited to the aforesaid embodiments. Also, the abrasive tape in accordance with the present invention is not limited to the elongated tape as in the aforesaid embodiments, and embraces a disk-shaped tape comprising a thin circular substrate and an abrasive layer overlaid on the thin circular substrate.

We claim:

1. An abrasive tape comprising a flexible substrate, and an abrasive layer overlaid on said flexible substrate by applying an abrasive coating composition containing abrasive grains and a binder onto said flexible substrate and drying the applied abrasive coating composition, wherein said binder contains a vinyl chloride resin have a $-SO_3M$ group and a number average molecular weight within the range of 15,000 to 60,000, where M represents Li, Na or K, and an epoxy group;
   wherein the ratio of said epoxy group to said vinyl chloride resin is within the range of 0.1 to 10 wt % and the amount of said vinyl chloride resin used is within the range of 15 to 50 parts to 100 parts of said abrasive grains.

2. An abrasive tape as defined in claim 1 wherein the grain sizes of said abrasive grains are within the range of approximately 16 μm to 0.1 μm.

3. An abrasive tape as defined in claim 1 wherein the content of vinyl chloride in said vinyl chloride resin is at least 60 wt %, and the content of other constituents copolymerizable with vinyl chloride in said vinyl chloride resin is lower than 40 wt %.

4. An abrasive tape as defined in claim 3 wherein the content of vinyl chloride in said vinyl chloride resin is within the range of 80 to 90 wt %, and the content of other constituents copolymerizable with vinyl chloride in said vinyl chloride resin is within the range of 20 to 10 wt %.

5. An abrasive tape as defined in claim 1 wherein the ratio of said $-SO_3M$ group to said vinyl chloride resin is within the range of 0.1 to 4.0 wt % in terms of $SO_4$.

6. An abrasive tape as defined in claim 5 wherein the ratio of said $-SO_3M$ group to said vinyl chloride resin is within the range of 0.2 to 1.5 wt % in terms of $SO_4$.

7. An abrasive tape as defined in claim 6 wherein the ratio of said $-SO_3M$ group to said vinyl chloride resin is within the range of 0.5 to 1.0 wt % in terms of $SO_4$.

8. An abrasive tape as defined in claim 1 wherein the thickness of said abrasive layer is not larger than 50 μm.

9. An abrasive tape as defined in claim 1 wherein the ratio of said epoxy group to said vinyl chloride resin is within the range of 0.8 to 8 wt %.

10. An abrasive tape as defined in claim 9 wherein the ratio of said epoxy group to said vinyl chloride resin in within the range of 1.5 to 7 wt %.

11. An abrasive tape as defined in claim 1 wherein said vinyl chloride resin is contained in said binder in a ratio of at least 30 wt % with respect to the total amount of binder components.

12. An abrasive tape as defined in claim 1 wherein a lubricant is added to said abrasive coating composition.

13. An abrasive tape as defined in claim 1 wherein the amount of said vinyl chloride resin used is within the range of 20 to 40 parts per 100 parts of the abrasive grains.

14. An abrasive tape as defined in claim 1 wherein a polyisocyanate is added to said abrasive coating composition.

15. An abrasive tape as defined in claim 14 wherein said polyisocyanate is a low molecular polyisocyanate having a plurality of isocyanate groups and having a molecular weight within the range of 150 to 2,000.

16. An abrasive tape as defined in claim 15 wherein the ratio of said low molecular polyisocyanate added is within the range of 1 to 60 wt % with respect to the total amount of binder components.

17. An abrasive tape as defined in claim 16 wherein the ratio of said low molecular polyisocyanate added is within the range of 10 to 40 wt % with respect to the total amount of binder components.

18. An abrasive tape as defined in claim 15 wherein the ratio of said low molecular polyisocyanate added is at least 20 parts per 100 parts of said vinyl chloride resin.

19. An abrasive tape as defined in claim 18 wherein the ratio of said low molecular polyisocyanate added is within the range of 30 to 60 parts per 100 parts of said vinyl chloride resin.

20. An abrasive tape as defined in claim 1 wherein said abrasive grains have a Mohs hardness of at least 6.

21. An abrasive tape as defined in claim 20 wherein said abrasive grains have a Mohs hardness of at least 8.

* * * * *